United States Patent [19]

Ho

[11] 4,345,299
[45] Aug. 17, 1982

[54] CAPACITIVE PRESSURE TRANSDUCER ASSEMBLY WITH IMPROVED OUTPUT LEAD DESIGN

[75] Inventor: Roland K. Ho, McHenry, Ill.
[73] Assignee: Motorola, Inc., Schaumburg, Ill.
[21] Appl. No.: 202,988
[22] Filed: Nov. 3, 1980
[51] Int. Cl.$^3$ .............................................. H01G 7/00
[52] U.S. Cl. ........................................ 361/283; 73/724
[58] Field of Search ................. 73/724, 718; 361/283, 361/306

[56] References Cited

U.S. PATENT DOCUMENTS

| | | | |
|---|---|---|---|
| 3,352,157 | 11/1967 | Seegmiller . | |
| 3,683,245 | 8/1972 | Bacher | 361/306 |
| 3,808,480 | 4/1978 | Johnston . | |
| 3,880,009 | 4/1975 | Johnston | 73/724 |
| 4,040,118 | 8/1977 | Johnston | 73/718 X |
| 4,178,621 | 12/1979 | Simonelic . | |

*Primary Examiner*—Elliot A. Goldberg
*Attorney, Agent, or Firm*—James W. Gillman; James S. Pristelski; Phillip H. Melamed

[57] ABSTRACT

A ceramic capacitive pressure transducer adaptable for use in automobiles is disclosed. The pressure transducer comprises a relatively thin diaphragm 13 having a capacitive electrode 20 thereon, a base substrate 10 having an opposing electrode 22 thereon, and an annular sealing ring 16 mounting the diaphragm to the base substrate. The base substrate has a peripheral lead bonding area 24 extending laterally beyond the perimeter of the diaphragm with two lead through holes 25, 26 in the bonding area. Metallic output leads 35, 36 are positioned in each of the lead through holes and mechanically and electrically bonded to lead metallizations 27, 28, 30, 31 deposited on the base substrate peripheral portion 24, and one (36) of the output leads is electrically connected to the diaphragm electrode 20 by means of a conductive material 37 inserted through an additional hole 33 in the base substrate located within the perimeter of the diaphragm and in an area of overlap between an outward radial projection 21 of the diaphragm electrode and an inward projection 32 of one (28) of the lead metallizations on the base substrate.

19 Claims, 6 Drawing Figures

CAPACITIVE PRESSURE TRANSDUCER ASSEMBLY WITH IMPROVED OUTPUT LEAD DESIGN

BACKGROUND OF THE PRESENT INVENTION

The present invention relates generally to the field of electromechanical pressure transducers and more particularly to the field of ceramic capacitive pressure transducers.

Ceramic capacitive pressure transducers are known and used in automotive systems for sensing engine vacuum pressure. Generally they comprise parallel plate capacitor electrodes separated by a gap wherein the spacing between the parallel plate electrodes is altered in response to sensed pressure changes thereby changing the capacitance created by these electrodes. Typically, one capacitor electrode is deposited on a top end surface of a relatively thick cylindrically shaped ceramic base substrate while the other capacitor electrode is deposited on a relatively thin disc shaped ceramic diaphragm. An annular glass insulating ring is deposited on the base substrate and provides a mounting means for joining the diaphragm to the base substrate as well as providing a sealing means for forming an internal cavity defined by the diaphragm, the top base substrate surface and the insulating ring. A predetermined reference pressure exists in the internal cavity and a predetermined displacement of the diaphragm with respect to the top surface of the base substrate is provided in response to the pressure difference between the pressure within the internal cavity and the pressure external to the internal cavity. An example of such a pressure transducer is illustrated in U.S. Pat. No. 4,178,621 which is assigned to the same assignee as the present invention.

One problem which exists with capacitive pressure transducers similar to those described above concerns the providing of a strong and reliable electrical and mechanical connection between the output leads of the transducer and the capacitor electrodes. In U.S. Pat. No. 4,178,621, noted above, the electrode output leads pass through holes in the base substrate and the electrical and mechanical connection of the leads to the respective electrodes and the diaphragm and base substrate is provided through the use of conductive epoxy. The capacitive transducers manufactured in accordance with the teachings in the above noted patent have the conductive epoxy applied directly to the transducer electrodes and leads in areas of overlap between the diaphragm and the base substrate. This electrically and mechanically connects the leads in the same manufacturing operation. While this technique is commercially feasible and has been used in the past for production units, this technique does not permit adequate visual inspection of the electrical and mechanical bond between the output leads and the transducer electrodes. In addition, since a single material, conductive epoxy, is utilized to provide both the electrical and mechanical bond between the output leads and the electrodes, as well as providing the mechanical bonds which attach the output leads to the transducer assembly, problems have occurred due to mechanical stresses on the leads rupturing the electrical and/or mechanical connections between the output leads and the electrodes since the conductive epoxy may not provide a strong enough mechanical bond for the leads.

In some prior transducers an annular ring of conductive metallization is provided on the base substrate top surface to contact the diaphragm electrode and thereby provide metallization on the top surface directly connected to the diaphragm electrode, while this ring also performs the function of sealing the internal cavity. This dual use of the ring requires compromising the mechanical and electrical properties of the ring. This type of structure also requires a metallization cross over in order to bring a connection to the base substrate electrode outside of the perimeter of the ring to enable connecting a lead to the base electrode. This adds to the complexity of the sensor by requiring additional insulating layers. Also, the use of this type of technique for the sealing ring would generally require the use of solder for providing the seal, and this may not be desirable in many instances.

SUMMARY OF THE INVENTION

An object of the present invention is to provide an improved pressure transducer assembly which overcomes the aforementioned deficiencies in prior art pressure transducers.

A more specific object of the present invention is to provide a pressure transducer which has an improved output lead design providing for visual inspection of mechanical and electrical connections between the output leads and the transducer assembly.

Another object of the present invention is to provide an improved pressure transducer in which electrical connection to the diaphgram electrode is accomplished without compromising the sealing of the internal cavity or the mechanical or electrical connection to the diaphragm output lead, and without requiring an additional insulating layer for a metallization cross over.

In one embodiment of the present invention an improved pressure transducer assembly in which pressure changes displace a diaphragm whose position determines electrical characteristics of the transducer assembly is provided. This pressure transducer assembly comprises: base substrate means having top and bottom substantially planar end surfaces, and having a peripheral portion with a lead bonding area thereon; flexible diaphragm means, relatively thin with respect to a thicker distance between said top and bottom base substrate end surfaces, having a planar central portion and a surrounding peripheral portion; mounting means for mounting said peripheral portion of said diaphragm means to said base substrate means top surface, said mounting means, said diaphragm planar central portion and said base substrate top surface generally forming an internal cavity wherein a predetermined reference pressure exists, said diaphragm central portion being displaceable with respect to said base substrate top surface in response to sensed pressure changes to thereby alter electrical characteristics of said transducer assembly, said base substrate means peripheral portion and lead bonding area extending laterally with respect to and beyond the perimeter of said diaphragm means and having, in said lead bonding area, at least one lead through hole from said top to bottom base substrate surfaces for receiving an electrical lead; said transducer assembly including at least a first planar electrode metallization mounted on said diaphragm central portion and having a radial outward projection; metallization deposited adjacent said lead through hole on at least one of said top and bottom base substrate surfaces; an electrical output lead positioned in said through hole and extending to at least said top and bottom base substrate surfaces; and connection means for electrically connecting said diaphragm electrode to said lead and connecting said lead to said base substrate metallization adjacent said lead through hole, whereby a strong and visually inspectable bond between the diaphragm lead and the base substrate means is provided.

Essentially, the improved pressure transducer assembly, as recited above, provides for an improved lead out configuration due to the visual accessibility of the bond between the output lead and metallizations provided on the base substrate means. This ensures the visual inspectability of the mechanical bond securing the output lead to the pressure transducer, as well as permitting a visual inspection of an electrical connection between the output lead and metallization on the base substrate means. This is accomplished by virtue of the lead bonding area being located on a lateral extension of the base substrate means which extends beyond the perimeter of the diaphragm. The strength of the mechanical bond is aided by the fact that the lead is disposed within a through hole in the thick base substrate means.

Preferably, two lead bonding through holes are provided in the extending peripheral lead bonding portion of the base substrate means and bonding metallizations are provided about both of these lead through holes on both the top and bottom surfaces of the base substrate means. Solder is used to connect leads positioned in each of these through holes to the metallizations surrounding the through holes on the top and bottom surfaces of the base substrate means.

According to another independent aspect of the present invention, a projection of one of the through hole metallizations on the top surface of the base substrate means extends inwardly and overlaps, but is spaced apart from, the diaphragm electrode radial outward projection. An additional hole is provided in the base substrate in this area of overlap such that a conductive bonding material, such as conductive epoxy, can be applied through this additional hole to provide the electrical connection between the diaphragm electrode and the inward projection of the top surface base substrate through hole metallization, thereby providing an electrical connection to one of the output leads. Thus, the electrical connection provided by the conductive epoxy between the diaphragm electrode and the top surface through hole metallization is not relied upon in order to mechanically join the output lead to the transducer assembly. This substantially eliminates having output lead stresses being transmitted to the epoxy bond. Also this structure, even if base substrate output lead through holes are not utilized, aids in providing an electrical connection from the diaphragm electrode to metallization on the base substrate top surface without requiring cross-over insulating layers on the base top surface for providing lead bonding areas outside of the internal cavity.

Preferably, the mounting means comprises an annular glass frit layer with the area of overlap between the diaphragm electrode outward radial projection and the through hole metallization inward projection being located outside of the annular ring to permit the applying of the conductive epoxy outside of the internal reference pressure cavity. This feature also permits partial visual inspection of the electrical bond provided by the conductive epoxy. It should be noted that instead of conductive epoxy, it is contemplated that a solder paste, which is subsequently heated, could be applied through said additional hole to form the electrical connection between the diaphragm electrode and the top surface through hole metallization.

Through the utilization of the above-mentioned structural features of the present invention, it has been found that the reliability of pressure transducers constructed in accordance with the above teachings has been substantially increased. This is attributable to the stronger mechanical bond provided for the output leads, the providing of visual inspection for the mechanical bonds for the output leads, the improved technique of connecting the diaphragm electrode to metallization on the base substrate top surface, and the provision for substantially eliminating mechanical output lead stresses for the electrical connection to the diaphragm electrode.

BRIEF DESCRIPTION OF THE DRAWINGS

For a more complete understanding of the present invention, reference should be made to the drawings, in which.

DESCRIPTION OF THE PREFERRED EMBODIMENT

Figure 1:
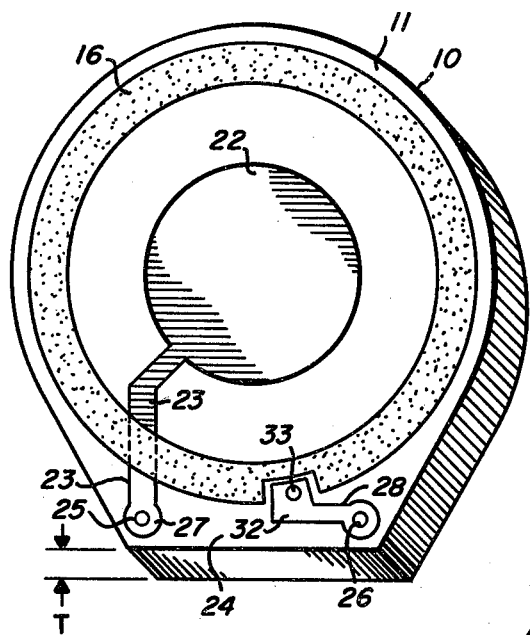
FIG. 1 is a perspective view illustrating the top surface of a metallized base substrate of a pressure transducer assembly constructed in accordance with the teachings of the present invention.
Figure 2:
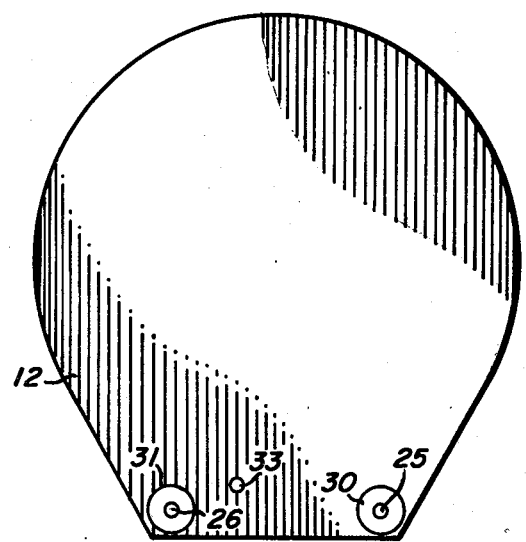
FIG. 2 is a plane view of the bottom surface of the metallized base substrate shown in FIG. 1.
Figure 3:
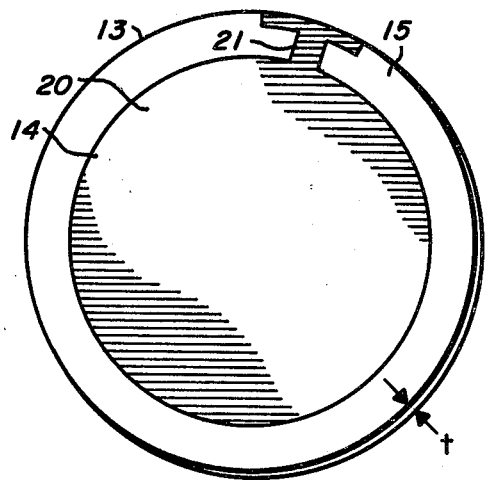
FIG. 3 is a perspective view of a metallized diaphragm of a pressure transducer assembly.

Referring to FIGS. 1 and 2, a base substrate 10 of a pressure transducer assembly is illustrated as comprising a planar top end surface 11 and a planar bottom end surface 12 disposed parallel to the surface 11 wherein each of the end surfaces has a solid horseshoe planar configuration. Preferably, the base substrate 10 comprises a ceramic material and has a thickness (the distance between the top and bottom surfaces 11 and 12) T such that the base substrate 10 is relatively thick with respect to the thickness of a relatively thin disc shaped flexible diaphragm 13 having a thickness t as shown in FIG. 3. Preferably the diaphragm 13 is also composed of a ceramic material which has been metallized and the diaphragm comprises a planar central portion 14 and a surrounding peripheral portion 15 extending along the perimeter of the diaphragm.

FIG. 1 illustrates that on the top surface 11 of the base substrate 10 an annular ring 16 of screened on thick film paste comprising glass frit particles is deposited. This ring forms a sealing and mounting means, after high temperature firing, which will join the diaphragm peripheral portion 15 to the top surface 11 of the base substrate thereby forming an internal cavity 17 (best shown in FIG. 6) essentially bounded by the diaphragm central portion 14, the annular glass ring 16 and the base substrate top surface 11. Within the internal cavity 17, a predetermined reference pressure exists and the pressure transducer assembly of the present invention functions by having the central planar portion 14 of the diaphragm being displaceable with respect to the base substrate top surface in response to sensed pressure changes between the reference pressure within the cavity 17 and pressures external to the cavity 17. The displacement of the diaphragm central portion 14 results in the alteration of the electrical characteristics, preferably capacitance, of the transducer assembly of the present invention.

A planar electrode metallization 20 is deposited on the diaphragm central portion 14 and includes a radial outward projection 21 which extends into the peripheral portion 15 of the diaphragm. The electrode metallization 20 comprises one electrode of a parallel plate capacitor whose capacitance will be altered in response to deflections of the diaphragm 13 which occur in response to sensed pressure changes. Another capacitor electrode metallization 22 is centrally deposited on the top surface 11 of the base substrate. The electrode metallization 22 is located substantially within the annular glass ring 16, but the metallization 22 has a radial outward projection 23 which extends beneath the annular ring 16 to a lateral peripheral portion and lead bonding area 24 of the base substrate 10 wherein this lead bonding area has first and second lead through holes 25 and 26 extending through said base substrate 10 from the top surface 11 to the bottom surface 12. It is contemplated that the annular glass ring 16 bonds the diaphragm peripheral portion 15 to the top surface 11 of the base substrate and that this results in the leadless subassembly shown in FIG. 4 with the peripheral portion and lead bonding area 24 of the base substrate being extended beyond the perimeter of the diaphragm 13 and located generally at the open end portion of the horseshoe shaped surfaces 11 and 12. For clarity glass ring 16 is not shown in FIG. 4.

Conductive metallizations 27 and 28 are deposited on the top surface 11 adjacent the lead through holes 25 and 26. The metallization 27 is contemplated as being overlapped with the radial outward extension 23 of the electrode 22 such that the metallization 27 is electrically connected to the central portion of the electrode metallization 22. It is contemplated that corresponding lead through hole metallizations 30 and 31 are deposited on the bottom end surface 12 adjacent the lead through holes 25 and 26, respectively, and this is shown in FIG. 2. It is also contemplated that the metallization 28 on the top surface 11 includes an inwardly extending projection 32 which, after the assembly of the diaphragm 13 to the base substrate 11, will overlap, but be spaced apart from, the diaphragm electrode radial outward projection 21. An additional through hole 33 is provided in the base substrate 10 in the area of overlap between the projections 21 and 32, and this area of overlap and the through hole 33 are positioned outside and thereby beyond the confines of the annular ring 16 so as to permit access of the diaphragm electrode projection 21 from outside of the internal cavity 17.

Figure 4:
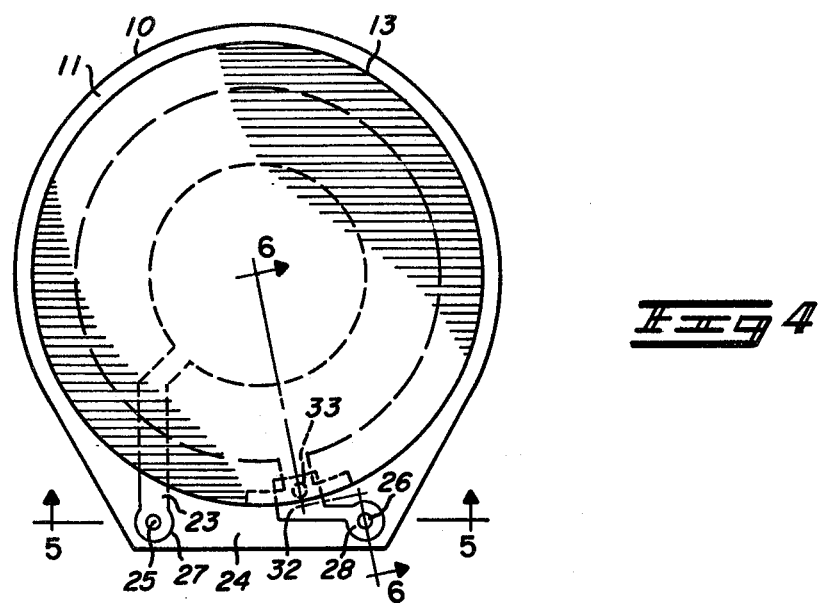
FIG. 4 is a plane view of a pressure transducer subassembly comprising the components shown in FIGS. 1 through 3.
Figure 5:
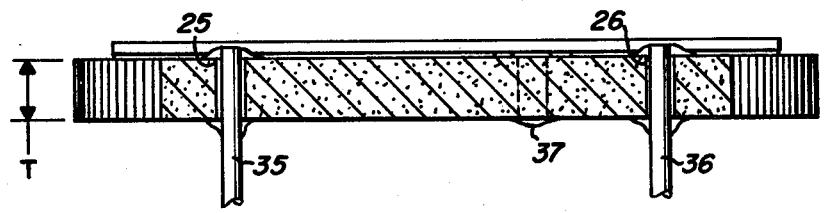
FIG. 5 is an enlarged cross-sectional view of the assembly shown in FIG. 4 after electrical output leads have been attached.
Figure 6:
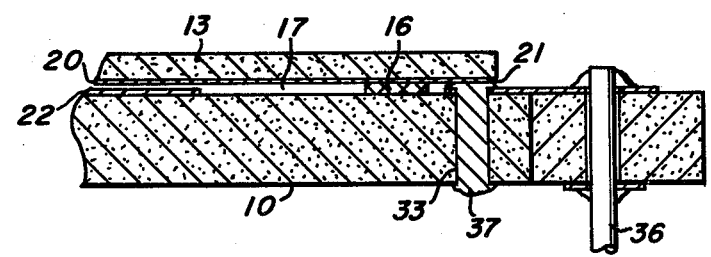
FIG. 6 is an enlarged cross-sectional view of the assembly shown in FIG. 4 after output leads have been attached.

It is contemplated that after assembly of the diaphragm 13 to the base substrate 10, which occurs due to a high temperature firing of the metallized substrates 10 and 13 after placing the diaphragm 13 on the glass ring 16 on the top surface 11, the subassembly shown in FIG. 4 will be provided. After providing this subassembly, metallic output electrical leads are positioned in the lead through holes 25 and 26 with the leads extending to at least the top and bottom base substrate surfaces 11 and 12. These electrical leads, shown in FIGS. 5 and 6 as leads 35 and 36 are soldered to both the top surface lead out metallizations 27 and 28, and the bottom surface metallizations 30 and 31, respectively. A conductive material, such as conductive epoxy, is applied through the additional through hole 33 to provide a conductive electrical contact between the diaphragm electrode projection 21 and the through hole metallization projection 32 to thereby provide electrical connection between the lead 36 and top surface metallization 28 and the diaphragm electrode comprising the metallizations 20 and 21. This is best illustrated in FIG. 6 where the conductive epoxy is identified by the reference number 37 which is shown as filling the additional through hole 33 and contacting the diaphragm projection 21 and top surface metallization projection 32. It should be noted that while preferably the conductive material making the connection between the projections 21 and 32 is conductive epoxy, other conductive materials such as solder paste can be utilized wherein if solder paste is utilized, the electrical connection will be made by heating the entire subassembly to a sufficient temperature to reflow the solder paste.

From the above description, it is apparent that the present invention has provided an improved output lead design for a ceramic capacitive transducer assembly wherein by visual inspection of the solder connections between the leads 35 and 36 and the through hole metallizations 25, 26, 30 and 31, respectively, a visual inspection of the mechanical bonds joining the leads to the transducer assembly is possible. By providing both top and bottom surface through hole metallizations about the through holes 25 and 26, the strength of the mechanical bonds joining the leads 35 and 36 to the base substrate 10 and diaphragm 11 is enhanced. By using the through hole configuration in the thick base substrate, the mechanical integrity of the lead bonds is strengthened, and by having the lead bonding area on a peripheral extension of the base substrate 10 which is not obscured by the diaphragm 13, visual inspection of these bonds is possible. Through the use of the additional through hole 33, an electrical connection between the diaphragm electrode (20 and 21) and the output lead 36 and top surface metallization 28 is made and this electrical connection is partially visually inspectable due to the particular configuration of the metallization patterns of the present invention.

In essence, the present invention has provided for a ceramic capacitive pressure transducer similar to that shown in U.S. Pat. No. 4,178,621. However, due to differences in the mechanical configuration of the present invention, a stronger mechanical bond is provided between the output leads and the capacitor electrodes, and the connection between the diaphragm electrode and its corresponding output lead has been made without subjecting this electrical connection to potentially large mechanical output lead stresses as was the case in the transducer illustrated in the previously noted U.S. Pat. No. 4,178,621. In addition, no cross-over metallization has been utilized which would add to the cost of the transducer while reducing reliability due to the possibility of pin holes in the cross-over layer.

It should be noted that preferably the present invention contemplates preventing the direct shorting of the diaphragm electrode to the base substrate electrode at high sensed pressure through the utilization of a thin insulating glass overglaze being applied over all of the base substrate electrode metallization within the glass insulating ring 13. Also, preferably, it should be noted that the nominal spacing between the diaphragm 13 and the top surface 11 of the base substrate is determined by three high temperature thick film screened pads (not shown) deposited on the diaphragm 13. It is contemplated that the thickness of these three high temperature screened pads will primarily determine the nominal spacing between the diaphragm and base substrate capacitive electrodes. It should be also noted that the present invention is equally applicable to both absolute pressure and relative pressure transducers wherein for one of these transducers, a fixed reference vacuum pressure is maintained within the cavity 17 whereas for the other of these transducers normal atmospheric pressure is maintained within the cavity 17. In each case, the transducer senses the difference between the pressure in the cavity 17 and the pressure external to the cavity 17 which presses on the top surface of the diaphragm 13 as viewed in FIG. 4.

Preferably the electrode metallizations are resinates and have solderable thick film interface metallizations for the lead out metallizations 27, 28, 30 and 31.

It also should be noted that the present invention, in its broadest sense, is applicable to pressure transducers other than capacitive transducers, as long as an electrode is provided on a flexible diaphragm and it is necessary to make an electrical connection to the diaphragm electrode. Thus, sensors wherein the diaphragm flexing causes changes in the resistance of elements on the diaphragm are within the contemplation of the present invention.

While I have shown and described specific embodiments of this invention, further modifications and improvements will occur to those skilled in the art. All such modifications which retain the basic underlying principles disclosed and claimed herein are within the scope of this invention.

I claim:

1. A pressure transducer assembly in which pressure changes displace a diaphragm whose position determines electrical characteristics of the transducer assembly, comprising:

base substrate means having top and bottom substantially planar end surfaces, and having a peripheral portion with a lead bonding area thereon;

flexible diaphragm means, relatively thin with respect to a thicker distance between said top and bottom base substrate end surfaces, having a planar central portion and a surrounding peripheral portion;

mounting means for mounting said peripheral portion of said diaphragm means to said base substrate means top surface, said mounting means, said diaphragm planar central portion and said base substrate top surface generally forming an internal cavity wherein a reference pressure exists, said diaphragm central portion being displaceable with respect to said base substrate top surface in response to sensed pressure changes to thereby alter electrical characteristics of said transducer assembly, said base substrate means peripheral portion and lead bonding area extending laterally with respect to and beyond the perimeter of said diaphragm means and having, in said lead bonding area, at least one lead through hole from said top to bottom base substrate surfaces for receiving an electrical lead;

said transducer assembly including at least a planar electrode metallization mounted on said diaphragm central portion and having a radial outward projection;

metallization deposited adjacent said lead through hole on of said base substrate means;

an electrical output lead positioned in said through hole and extending to at least said top and bottom base substrate surfaces; and connection means for electrically connecting said diaphragm electrode to said lead and connecting said lead to said base substrate metallization adjacent said lead through hole, wherein said adjacent through hole metallization is positioned on said base substrate top surface, and wherein a planar projection of said adjacent through hole metallization extends generally inwardly and overlaps, but is spaced apart from, said diaphragm electrode radial outward projection, and wherein said connecting means comprises means for electrically connecting said adjacent base substrate through hole metallization inward projection and said diaphragm means electrode outward projection in said area of overlap.

2. A pressure transducer assembly according to claim 1 which includes an electrode metallization centrally positioned on said base substrate top surface, said base substrate and diaphragm electrodes effectively forming a capacitor whose capacitance is altered in accordance with the displacement of said diaphragm means in response to sensed pressure changes.

3. A pressure transducer assembly according to claim 1 wherein said mounting means comprises an annular ring positioned on said diaphragm means peripheral portion and said base substrate top surface, and wherein said radial outward projection on said diaphragm means extends beyond said annular ring to permit access of said outward projection by conductive means applied from outside of said internal cavity.

4. A pressure transducer assembly according to claim 3 which includes an additional through hole in said base substrate means positioned in the area of overlap between the base substrate through hole metallization inward projection and the diaphragm electrode radial outward projection, whereby said through hole aids in bonding said base substrate through hole metallization to said diaphragm electrode.

5. A pressure transducer assembly according to claim 4 wherein said connecting means includes conductive epoxy applied through said additional through hole for electrically connecting together said base substrate metallization inward projection and said diaphragm means metallization outward projection.

6. A pressure transducer assembly according to any of claims 1 or 4 wherein said base substrate means also has metallization provided on said bottom surface adjacent said lead through hole and wherein said lead is electrically and mechanically joined to said bottom surface metallization adjacent said through hole.

7. A pressure transducer assembly according to claim 6 wherein said lead is soldered to both said top surface and bottom surface through hole metallizations.

8. A pressure transducer assembly according to claim 2 wherein a second lead out through hole is provided in said base substrate means in said lead bonding area, a second electrical lead is positioned in said second through hole, and wherein metallization is provided on said top surface of said base substrate means adjacent said second through hole, said metallization contacting said second electrode and being electrically and mechanically connected to said metallic lead in said second through hole.

9. A pressure transducer assembly according to claim 8 wherein said base substrate means has metallization provided on both said top and bottom surfaces adjacent each of said lead through holes and wherein each of said leads in said through holes is electrically and mechanically joined to said metallizations adjacent each of said through holes, respectively.

10. A pressure transducer assembly according to any of claims 1, 2 or 9 wherein both said base substrate means and said diaphragm means comprise ceramic substrates.

11. A pressure transducer assembly according to claim 10 wherein said diaphragm means comprises a ceramic disc.

12. A pressure transducer assembly according to claim 11 wherein said base substrate means comprises a generally disc shaped ceramic substrate with portions laterally extending beyond the circumference of said diaphragm means, said base substrate means generally having its top and bottom surfaces configured in a solid horseshoe planar configuration.

13. A pressure transducer assembly in which pressure changes displace a diaphragm whose position determines electrical characteristics of the transducer assembly, comprising:
base substrate means having top and bottom substantially planar end surfaces, and having a peripheral portion with a lead bonding area thereon;
flexible diaphragm means, relatively thin with respect to a thicker distance between said top and bottom base substrate end surfaces, having a planar central portion and a surrounding peripheral portion;
mounting means for mounting said peripheral portion of said diaphragm means to said base substrate means top surface, said mounting means, said diaphragm planar central portion and said base substrate top surface generally forming an internal cavity wherein a reference pressure exists, said diaphragm central portion being displaceable with respect to said base substrate top surface in response to sensed pressure changes to thereby alter electrical characteristics of said transducer assembly;
said base substrate means peripheral portion and lead bonding area extending laterally with respect to and beyond the perimeter of said diaphragm means, and having, in said lead bonding area, at least one metallization on the top surface of said peripheral portion;
said transducer assembly including at least a planar electrode metallization mounted on said diaphragm central portion and having a radial outward projection;
an electrical output lead electrically connected on said peripheral portion to said top surface metallization, wherein a projection of said top surface metallization extends generally inwardly and overlaps, but is spaced apart from, said diaphragm electrode radial outward projection; and
wherein said base substrate means includes a through hole positioned in the area of overlap between the base substrate top surface metallization inward projection and the diaphragm electrode radial outward projection, whereby said through hole aids in bonding said base substrate top surface metallization to said diaphragm electrode; and connection means for electrically connecting said diaphragm electrode to said base substrate top surface metallization whereby a strong bond between the diaphragm electrode and the base substrate means top surface metallization is provided.

14. A pressure transducer assembly according to claim 13 wherein said connecting means includes conductive means applied through said hole for electrically connecting together said base substrate metallization inward projection and said diaphragm means metallization outward projection.

15. A pressure transducer assembly according to claim 14 wherein said mounting means comprises an annular ring positioned on said diaphragm means peripheral portion and base substrate top surface, and wherein said radial outward projection of said diaphragm means metallization extends beyond said annular ring to permit access of said projection by conductive means applied from outside of said internal cavity.

16. A pressure transducer assembly according to any of claims 13-15 which includes an electrode metallization, in addition to said top surface metallization connected to said diaphragm electrode, centrally positioned on said base substrate top surface, said base substrate and diaphragm electrode metallizations effectively forming a capacitor whose capacitance is altered in accordance to the displacement of said diaphragm means in response to sensed pressure changes.

17. A pressure transducer assembly in which pressure changes displace a diaphragm whose position determines electrical characteristics of the transducer assembly, comprising:
base substrate means having top and bottom substantially planar end surfaces, and having a peripheral portion with a lead bonding area thereon;
flexible diaphragm means, relatively thin with respect to a thicker distance between said top and bottom base substrate end surfaces, having a planar central portion and a surrounding peripheral portion;
mounting means for mounting said peripheral portion of said diaphragm means to said base substrate means top surface, said mounting means, said diaphragm planar central portion and said base substrate top surface generally forming an internal cavity wherein a reference pressure exists, said diaphragm central portion being displaceable with respect to said base substrate top surface in response to sensed pressure changes to thereby alter electrical characteristics of said transducer assembly;
said base substrate means peripheral portion and lead bonding area extending laterally with respect to and beyond the perimeter of said diaphragm means, and having, in said lead bonding area, at least one metallization on the top surface of said peripheral portion;
said transducer assembly including at least a planar electrode metallization mounted on said diaphragm central portion and having a radial outward projection;
an electrical output lead electrically connected on said peripheral portion to said top surface metallization, wherein a planar projection of said top surface metallization extends generally inwardly and overlaps, but is spaced apart from, said diaphragm electrode radial outward projection; and
connection means positioned in the area of overlap between the base substrate top surface metallization inward projection and the diaphragm electrode radial outward projection for electrically connecting said diaphragm electrode to said base substrate top surface metallization in said area of overlap.

18. A pressure transducer assembly according to claim 17 wherein said mounting means comprises an annular ring positioned on said diaphragm means peripheral portion and base substrate top surface, and wherein said radial outward projection of said diaphragm means metallization extends beyond said annular ring to permit access of said projection by conductive means applied from outside of said internal cavity.

19. A pressure transducer assembly according to claim 18 which includes an additional planar electrode metallization, in addition to said base substrate top surface metallization connected to said diaphragm electrode, centrally positioned on said base substrate top surface, said additional base substrate and diaphragm electrode metallizations effectively forming a capacitor whose capacitance is altered in accordance to the displacement of said diaphragm means in response to sensed pressure changes.

* * * * *